C. S. SORENSEN.
BUTTER CUTTING MACHINE.
APPLICATION FILED MAY 22, 1914.
1,187,561.
Patented June 20, 1916.
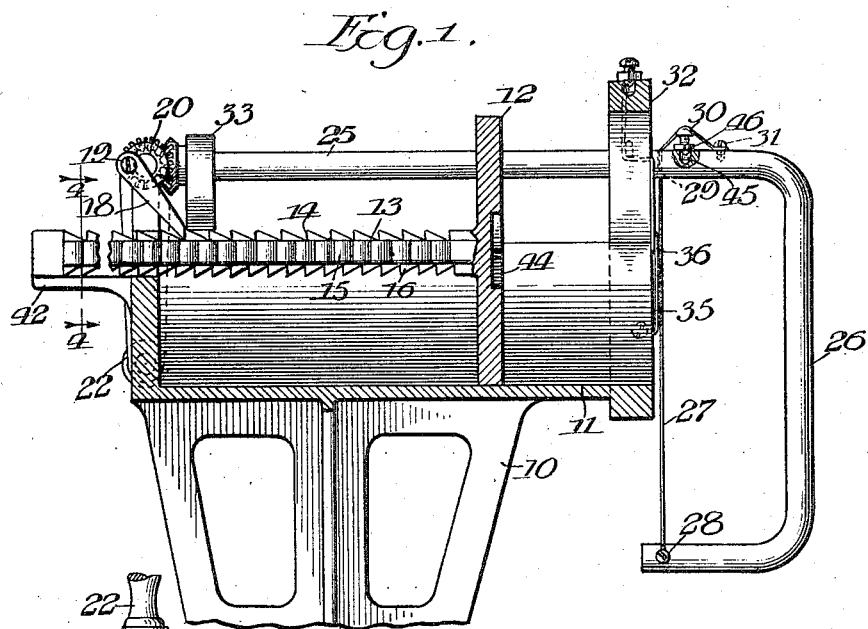
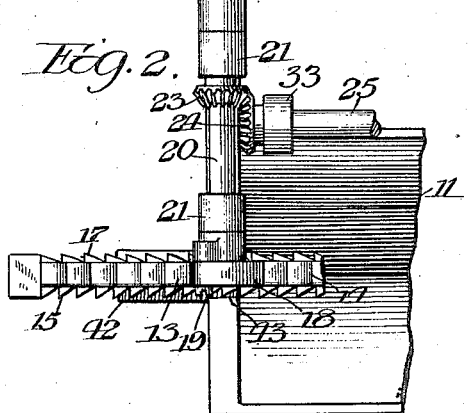
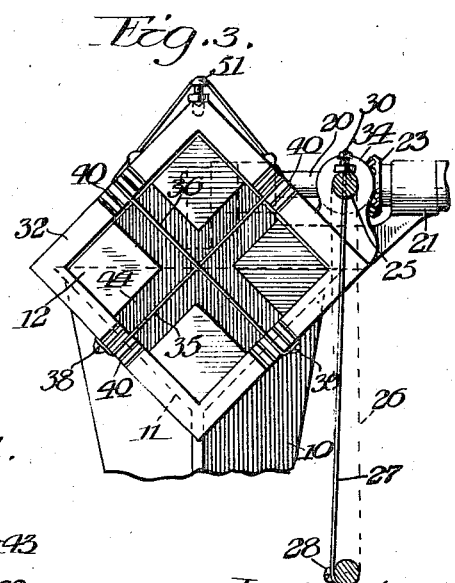
Witnesses
O. M. Wennich
E. M. Hatcher
Inventor
Christian S. Sorensen
by Gillson & Gillson
Attys.

UNITED STATES PATENT OFFICE.

CHRISTIAN S. SORENSEN, OF CHICAGO, ILLINOIS, ASSIGNOR, BY MESNE ASSIGNMENTS, TO PERRY G. DAVIS, OF CHICAGO, ILLINOIS.

BUTTER-CUTTING MACHINE.

1,187,561.   Specification of Letters Patent.   Patented June 20, 1916.

Application filed May 22, 1914.   Serial No. 840,182.

*To all whom it may concern:*

Be it known that I, CHRISTIAN S. SORENSEN, a citizen of the United States, and resident of Chicago, county of Cook, and State of Illinois, have invented certain new and useful Improvements in Butter-Cutting Machines, of which the following is a specification and which are illustrated in the accompanying drawings, forming a part thereof.

The invention relates to machines for dividing masses of butter or like material into prints or patties of uniform size.

The object of the invention is to provide a machine of simple and inexpensive construction which is especially adapted for cutting a predetermined number of prints of uniform size from a larger mass of fixed dimensions.

The invention is exemplified in the structure to be hereinafter described and which is illustrated in the accompanying drawings, wherein—

Figure 1 is a central longitudinal sectional view of the device; Fig. 2 is a detail plan view of one of the same; Fig. 3 is an end view, some of the parts being shown in section; Fig. 4 is a detail sectional view taken on the line 4—4 of Fig. 1, looking in the direction of the arrows, and Fig. 5 is a view showing a modified form of a detail of the construction.

The standard or support for the device is represented at 10. Secured directly to the upper part of this standard is a trough or container 11 for receiving the brick of butter to be cut. Within this trough 11 is slidably mounted a plunger 12. This plunger desirably has an intermittent movement, its travel at each step determining the thickness of the patty to be cut.

A bar 13 projects from the rear face of the plunger 12. As shown, this bar is of rectangular cross section, and a separate set of rack teeth, as 14, 15, 16 and 17 is formed upon each of its several faces. The teeth of these racks are preferably of different spacing.

The bar 13 is intermittently operated by the engagement of a dog 18 with one of its sets of rack teeth, as 14, 15, 16 and 17. The spacing of the teeth in the particular rack with which the dog is engaged determines the travel of the plunger 12, at each step. The dog 18 is mounted upon the wrist pin 19 of a crank shaft 20. As shown, this crank shaft extends transverse to the length of the trough 11 and is journaled in bearings 21, 21, which are formed integral with the walls of the trough. A hand crank 22 mounted upon one end of the crank shaft serves for operating the device. A second shaft 25 extends parallel with the length of the trough 11 adjacent one side of the same. It is journaled in bearing lugs 33, 34, formed upon the side wall of the trough.

The shaft 25 is operatively connected with the crank shaft 20 by bevel gears 23, 24, one mounted on the crank shaft 20 intermediate its ends and the other mounted on the shaft 25, at one end of the same. The other end of the shaft 25 extends beyond the end of the trough 11 and is formed into a bow or U-shaped frame 26 across which is stretched a cutting strand 27 in position to move over the end of the trough upon rotation of the shaft. As shown, one end of the strand is fixed in the outer end of the bow 26, as by a set screw 28. At its other end, the cutting strand 27 is extended through an opening 29 in the shaft 25, thence over an adjusting screw 30, and is attached to the shaft 25 beyond the adjusting screw 30, as by a set screw 31. The point of the adjusting screw 30 is loosely seated in a socket 45, formed in the shaft 25. A nut 46 mounted on the adjusting screw adjustably supports the same whereby turning the nut serves to adjust the tension of the cutting strand.

A frame 32, of open rectangular form is provided at the forward end of the trough 11. This frame is crossed by a pair of relatively perpendicular cutting strands 35 and 36. These strands serve to divide the mass of butter as it is forced through the frame 32.

In the construction shown in the drawings, the cutting strands 35 and 36 are formed from a single wire. The ends of this wire are secured to the frame by means of the set screws 38 and 39. An intermediate part of the wire is extended over an adjusting screw 51. This adjusting screw is desirably located at the top of the frame 32 and may be of the same construction as the adjusting screw 30.

The face of the frame 32 is provided with a series of slots, as 40, at each side of the same. These slots serve to adjustably position the cutting strands 35, 36, whereby masses of butter of different dimensions may be divided into a plurality of equal divisions.

The face of the plunger 12 is preferably recessed, as shown at 44, to permit the reception of the cutting strands, 35 and 36, in any of their adjusted positions, and to permit a portion of the face of the plunger to protrude beyond the cutter bars 35 and 36 to emit the last part of the mass of butter from the trough The end of the trough 11 remote from the frame 32 is provided with a laterally projecting bracket 42 and a guideway 43 to support and guide the bar 13. It will be understood that any one of the sets of rack teeth 14, 15, 16 or 17 may be brought into position for engagement by the pawl 18 by simply lifting the plunger 12, and bar 13 out of the trough, rotating them axially through a part of a revolution and then returning them in the new angular relation.

If desired a crank disk 47 may be mounted upon the end of the crank shaft 20, the same being drilled, as at 50 (Fig. 5) to receive the wrist pin 19 at any one of a plurality of positions which are differently spaced from the axis of the shaft. In this case, the throw of the plunger 12 may be regulated even though the bar 13 be provided with but one set of rack teeth. It is desirable to so portion the throw to the length of the mass of butter to be cut that the last set of patties cut from the mass will have the same thickness as all the others.

I claim as my invention,—

1. In a butter cutting machine, in combination, a trough, a plunger movable through the trough, a frame mounted upon the trough in front of the plunger, the frame having an opening in line with the plunger, a pair of relatively perpendicular cutting strands extending across the frame opening, said strands being formed from a single piece of wire having its two ends attached to the frame, and a straining device acting on that part of the wire which connects the two strands.

2. In a butter cutting machine, in combination, a trough, a plunger movable through the trough, a frame mounted on the trough in front of the plunger, the said frame being provided with an opening in line with the plunger, a pair of relatively perpendicular cutting strands extending across the frame opening, the frame being grooved to support the strands in a plurality of laterally adjusted positions and the two strands being formed from a single piece of wire having both of its ends attached to the frame, and a straining device acting on that part of the wire which connects the two strands whereby the strands may be laterally adjusted upon releasing the tensioning device.

3. In a butter cutting machine, in combination, a trough of upright V-shape in cross section, a plunger movable through the trough, a frame mounted on the trough in front of the plunger, the frame having an angular opening in line with the plunger with a side of the opening in the plane of each of the side walls of the trough, and a pair of laterally adjustable cutting strands extending across the frame opening, each strand intersecting one of the said sides of the opening.

4. In a butter cutting machine, in combination, a trough of upright V-shape in cross section, a plunger movable through the trough, a frame mounted on the trough in front of the plunger, the frame having an angular opening in line with the plunger with a side of the opening in the plane of each of the side walls of the trough, a pair of cutting strands extending across the frame opening, each strand intersecting one of the said sides of the opening, the frame being grooved to support the strands in a plurality of laterally adjusted positions, and the two strands being formed from a single piece of wire having both of its ends attached to the frame and a straining device acting on that part of the wire which connects the two strands whereby the strands may be adjusted toward and away from the bottom corner of the frame opening upon releasing the tensioning device.

CHRISTIAN S. SORENSEN.

Witnesses:
CHARLES B. GILLSON,
E. M. KLATCHER.